July 28, 1942.　　W. A. STEWART　　2,291,174
MULTIPLE WHEEL DRIVE ASSEMBLY
Filed March 16, 1939　　5 Sheets-Sheet 1
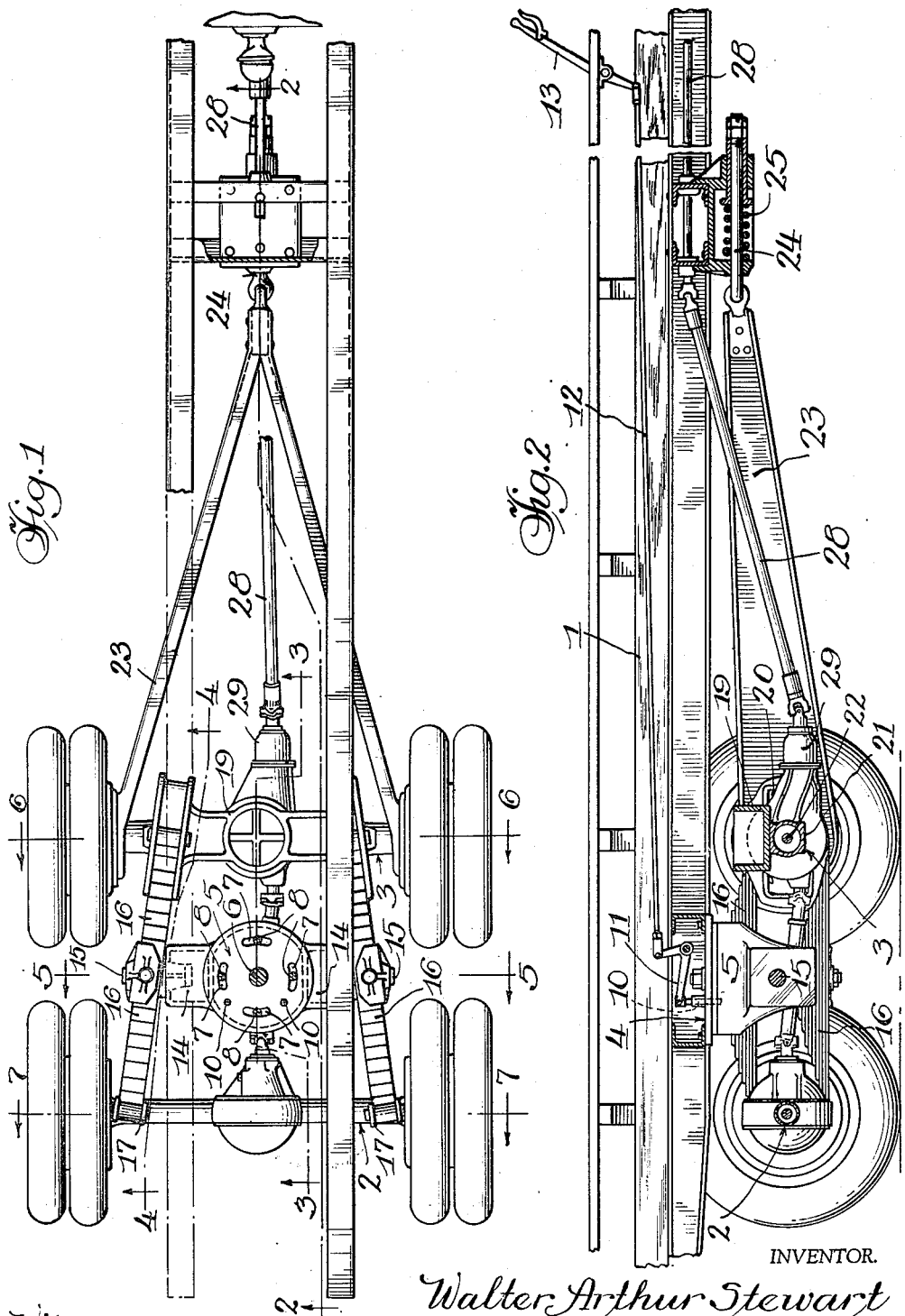
INVENTOR.
Walter Arthur Stewart
Parkinson & Lane
ATTORNEYS July 28, 1942.   W. A. STEWART   2,291,174
MULTIPLE WHEEL DRIVE ASSEMBLY
Filed March 16, 1939   5 Sheets-Sheet 2

Witness:
Chas. L. Kursh

INVENTOR.
Walter Arthur Stewart
Parkinson & Lane
ATTORNEYS.

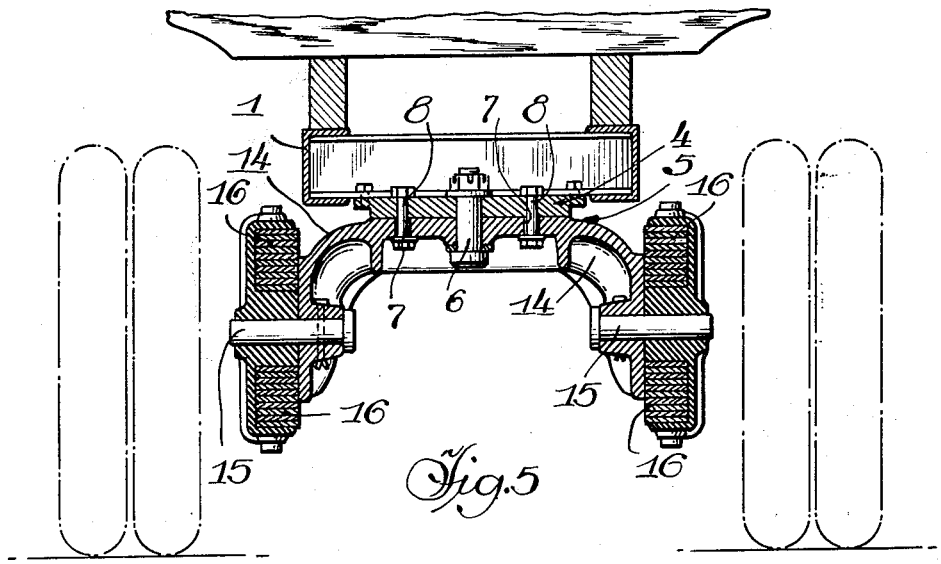
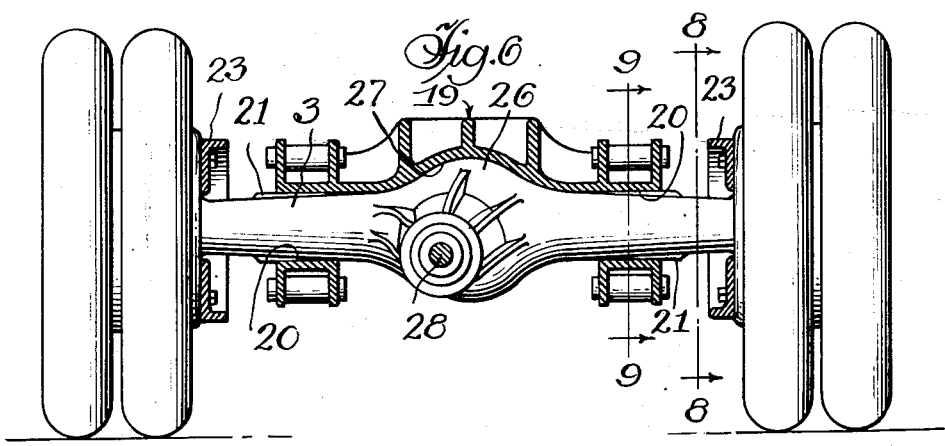
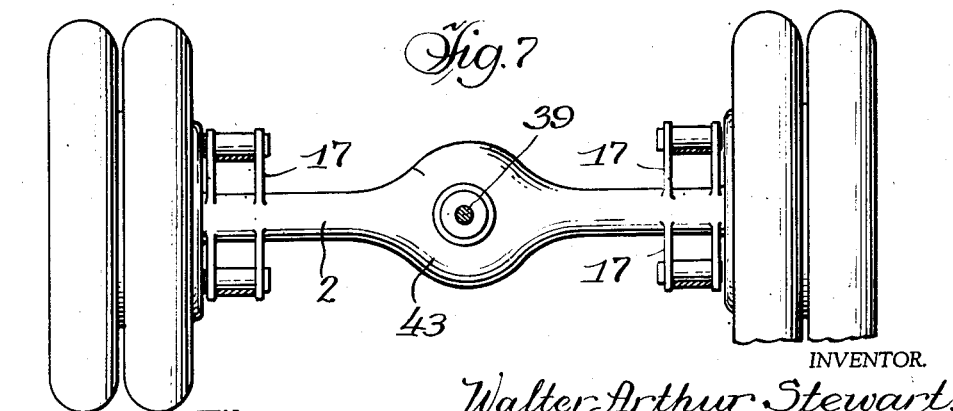

July 28, 1942.　　W. A. STEWART　　2,291,174
MULTIPLE WHEEL DRIVE ASSEMBLY
Filed March 16, 1939　　5 Sheets-Sheet 4
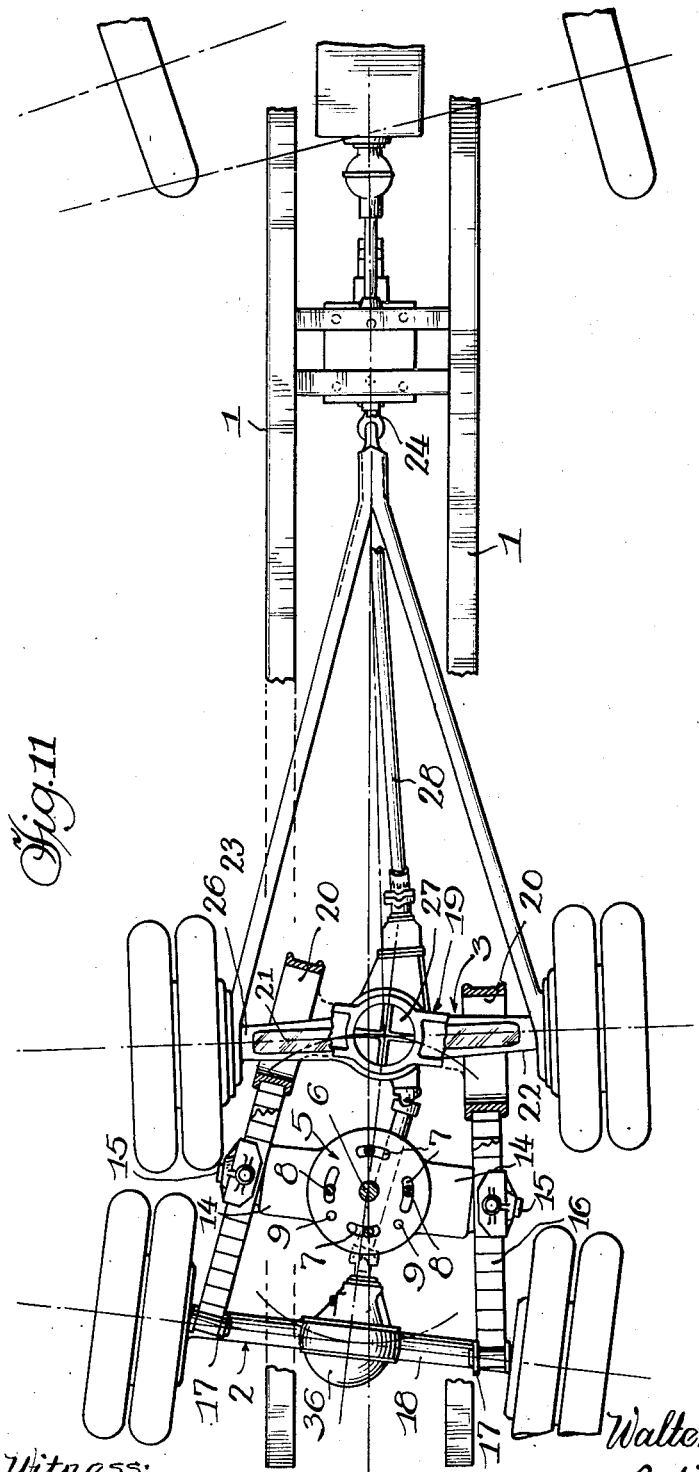
INVENTOR.
Walter Arthur Stewart
Parkinson & Sans
ATTORNEYS
Witness:
Chas. R. Kourshr Patented July 28, 1942

2,291,174

UNITED STATES PATENT OFFICE 2,291,174

MULTIPLE WHEEL DRIVE ASSEMBLY

Walter Arthur Stewart, Bridgman, Mich.

Application March 16, 1939, Serial No. 262,101

3 Claims. (Cl. 180—22)

The present invention relates to a multiple wheel drive assembly for automotive vehicles such as trucks having four or more rear drive wheels in order to carry heavy loads and secure increased traction.

One of the problems of this type of trucks has been the lack of maneuverability on the road, especially when negotiating a curve or a sharp turn.

A further problem resides in the difficulty of applying the necessary power to the drive wheels independently of the amount of power required for the other drive wheels, which problem has an important bearing on the wear of tires, on the pulling power of the individual drive wheels, and on the distribution of load carried by the drive wheels.

One object of my invention is to overcome these difficulties and to provide for greater control of the multiple wheels on the rear of the truck to permit the multiple wheels to each automatically assume the contour of curve in conformity with the path to be traveled by the vehicle in turning, whether forward or backward, while at the same time providing an individual supply of power to the individual drive wheels under all conditions of driving, so that the engine energy may be distributed equally among all of the drive wheels or proportionately to those drive wheels which, under certain conditions, require more power.

It is also necessary to provide locking means associated with the differential provided to vary the flow of power between the forward and rear drive wheels permitting the application of equal power to the front and rear drive axles under some driving conditions, such as when a mud hole is encountered.

It is also deemed advisable to have locking means to hold all of the drive wheels in line parallel with the body of the truck at certain times, for instance, when the truck may be backing up and a particular curve must be negotiated.

Another object is to so position the springs as to bring their forward ends closer together at the front drive axle to afford a more definite center of load for the truck and to provide a greater radius for the turning of the front drive wheels and to lessen the shifting of the chassis of the truck when one of the drive wheels rides over an elevated or depressed portion of the road.

Another object is to provide a mounting and drive assembly pivotally attached to the chassis of the truck to permit the swinging of the mounting and drive assembly within a fixed radius both with respect to the path of the truck and with respect to the angle assumed by the pair of front drive wheels, and to provide automatic means for automatically causing the shifting of the front and rear drive wheels when the truck is making a turn. This last feature is accomplished by a wishbone tongue attached to the mounting assembly of the two front drive wheels at one end of the wishbone, the other end of the wishbone being yieldably attached and held under tension to the chassis of the truck at a point forward of the mounting and drive assembly.

It is not only necessary to provide for the automatic positioning of the front and rear drive wheels with respect to the path of travel, but it is also necessary to so mount the wheels in the mounting and driving assembly that the front and rear drive wheels may move vertically independent of the other, and that the front drive wheels may also move independent of the rear wheels longitudinally. These objects and requirements are met and embodied in the novel features of my invention.

Another object of my invention is to provide a direct drive utilizing a hypoid unit of novel design for operating the forward pair of the rear truck wheels. This hypoid unit may be used with any successive set of rear drive wheels, and the drive shaft is so connected by universal joints or otherwise to the differential designed to vary the flow of power and to the differentials employed on each axle of the front and rear drive wheels as to permit a separate and independent movement of the wheels vertically, longitudinally and arcuate without interrupting the flow of power and securing the maximum of clearance between the assembly and the ground.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while I have shown therein a preferred embodiment, it is to be understood that the same is susceptible of modification and change, and comprehends other details, arrangements of parts, features and constructions without departing from the spirit of the invention.

In the drawings:

Fig. 1 is a fragmentary view in plan of a truck chassis with body removed and with parts of the frame broken away.

Fig. 2 is a longitudinal section with the body, rear wheels and rear frame member removed, taken on line 2—2 of Fig. 1.

Fig. 5 is an enlarged cross section through the bolster or turntable and frame taken on the line 5—5 of Fig. 1.

Fig. 6 is an enlarged cross sectional view through the front or secondary bolster or turntable on the line 6—6 of Fig. 1.

Fig. 7 is a view taken on the line 7—7 of Fig. 1 showing the rear differential and its connection with the rear ends of the springs.

Fig. 10 is a view in front elevation of the secondary bolster.

Fig. 11 is a view similiar to Fig. 1 but with the drive assembly in a changed position as when making a turn to the left.

Figure 3:
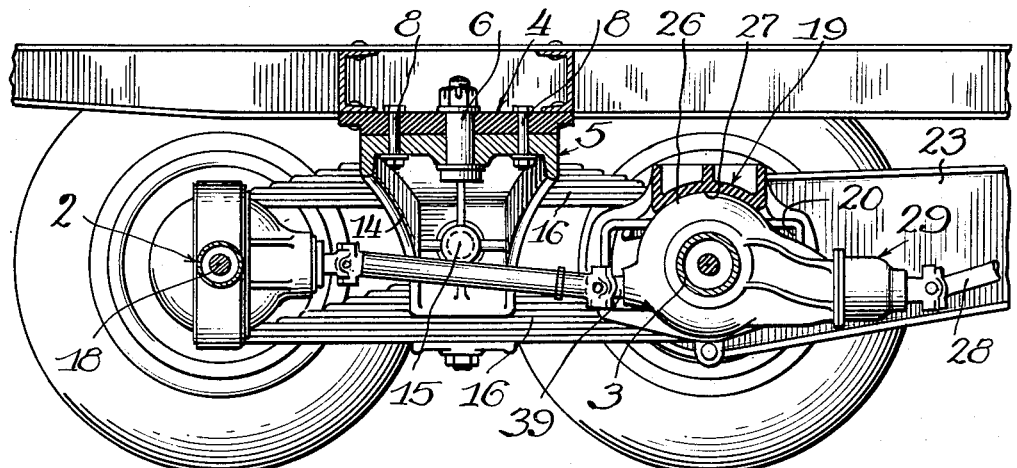
Fig. 3 is an enlarged sectional view of the wheels and drive assembly taken on the irregular line 3—3 of Fig. 1.

Referring more specifically to the drawings, 1 represents the chassis of a truck having two or more driving axle housings 2 and 3. Fixedly mounted crosswise of the chassis at a point between the axle housings 2 and 3 is a bolster plate 4 generally made of heavy steel construction. A cast steel channel member 5 is pivotally mounted to the bolster plate 4 by a king bolt 6 which permits the channel member to rotate with respect to the bolster 4 and act as a turntable. In order to control the arc of rotation of the channel turntable upon the bolster, channel member 5 is provided with a series of slots 7 through which an equal number of bolts 8 secured to the bolster member 4 are inserted. These bolts 8 also help to hold the channel member in close engagement with the bolster member 4, although permitting a predetermined amount of rotatable movement.

Additional provision is made by means of two holes 9 in the channel member 5 for engagement with a pair of plungers 10, operated by a bell crank 11, which in turn is actuated by a customary rod 12 and hand lever 13 from the operator's seat. When it is desired to lock the channel member 5 in non-rotating position with respect to the bolster plate 4, the operator of the truck pushes the lever 13 forward, which acts to push the pair of plungers 10 into locking engagement with the holes 9. When it is desired to throw the drive assembly into normal operation in accordance with the inventive features herein disclosed, the operator pulls the lever 13 back, which operates to disengage the plungers and thus permit the partial rotation above specified, as shown in Fig. 2.

The turntable channel member 5 is elongated to form two arms 14 running crosswise of the chassis 1 and adapted to turn with the channel member 5. Rotatably mounted on the axle portion 15 at the ends of the arms 14 is a pair of springs 16. This rotatable mounting on the axle portion 15 permits the springs to oscillate on the axis of the arms 14 and the axle portion 15. At the rear end of the springs 16, is a shackle bar 17, which carries one end of the rear axle housing 2. The springs 16 at their front ends are attached to a link 34 which has rocking attachment to a front secondary bolster 19, which acts as a rocking shackle for the front end of the upper and lower springs. This secondary bolster 19 is provided at its ends with elongated slots 20 in which are slidably mounted flattened surfaces 21 on the axle 3 which hold and secure the front drive axle ends 22. It will thus be seen that provision is made for considerable rotative movement of the front tandem axle housing 3 with respect to the chassis 1 of the truck within the limits of the slots 20.

Figure 8:
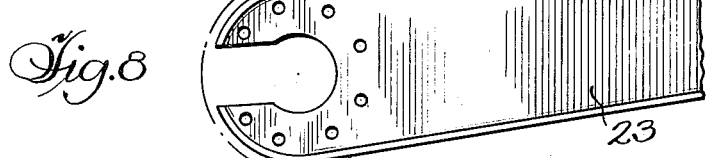
Fig. 8 is a fragmentary view in side elevation of the rear end of one of the members of the "wishbone" draw bar or tongue taken on line 8—8 of Fig. 6.
Figure 4:
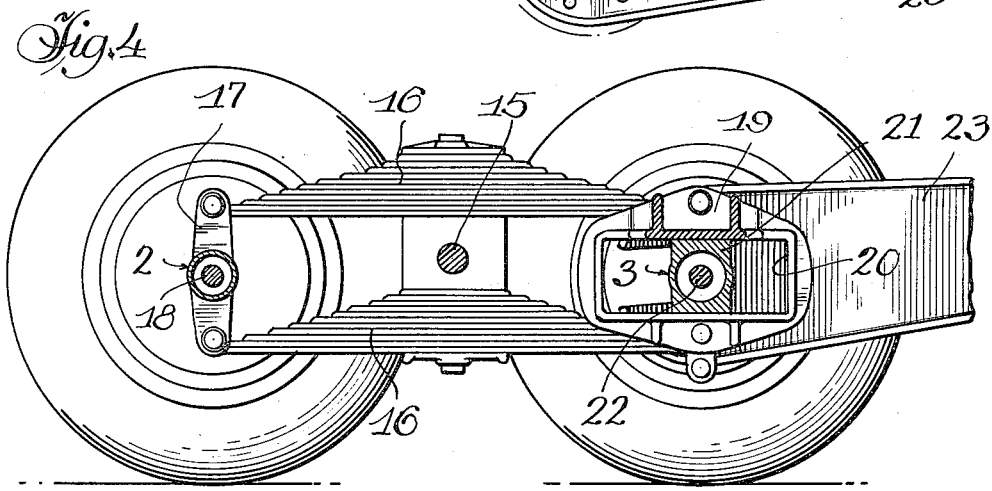
Fig. 4 is an enlarged sectional view taken on the irregular line 4—4 of Fig. 1 to more clearly show the spring assembly.
Figure 9:
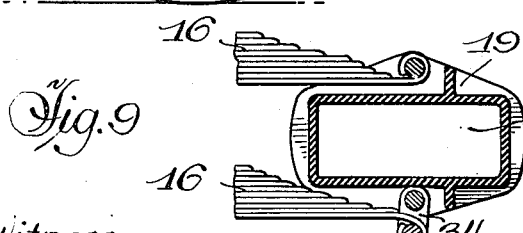
Fig. 9 is a fragmentary detail section on line 9—9 of Fig. 6 of one end of the front secondary bolster or turntable and which end is adapted to act as a shackle for the front end of the upper and lower springs and a bearing for the front drive axle.

A wishbone tongue or draw bar 23 is attached to the front axle housing 3 at points near the wheels. The forward end of wishbone 23 is attached to the chassis 1 at a point forward of the front drive axle housing 3 and is held by a bolt 24, which is actuated by compression springs 25, which operate to securely hold the wishbone at a yielding tension at all times. A preferred form of attachment of the rear ends of the wishbone 23 to the forward driving axle housing 3 is shown in Fig. 8, which may be attached to the flange plates of the brake drum of each of the front tandem drive wheels.

The front drive axle housing 3 is provided with a raised portion 26 which has pivotal engagement with recessed portion 27 of the supplemental bolster member 19, as more clearly shown in Fig. 6, permitting a swing of the drive assembly along the lines of the arc shown in Fig. 11, thus supplementing the turntable effect of the primary turntable provided by the bolster plate 4 and the steel channel member 5. When the truck is traveling in a straight line and the front and rear drive wheels register in a straight line, the axle housing 3 and the supplemental bolster member 19 would be parallel. When, however, the truck is turned as illustrated, for instance, in Fig. 11, the rear drive assembly operating on the primary turntable 5 and the front turntable provided by engagement with the axle housing 3 with the supplemental bolster member 19, the front drive wheels are permitted to assume a different angle with respect to the rear drive axle 2. The usual differential is employed between the front drive wheels within the housing 3.

Figure 13:
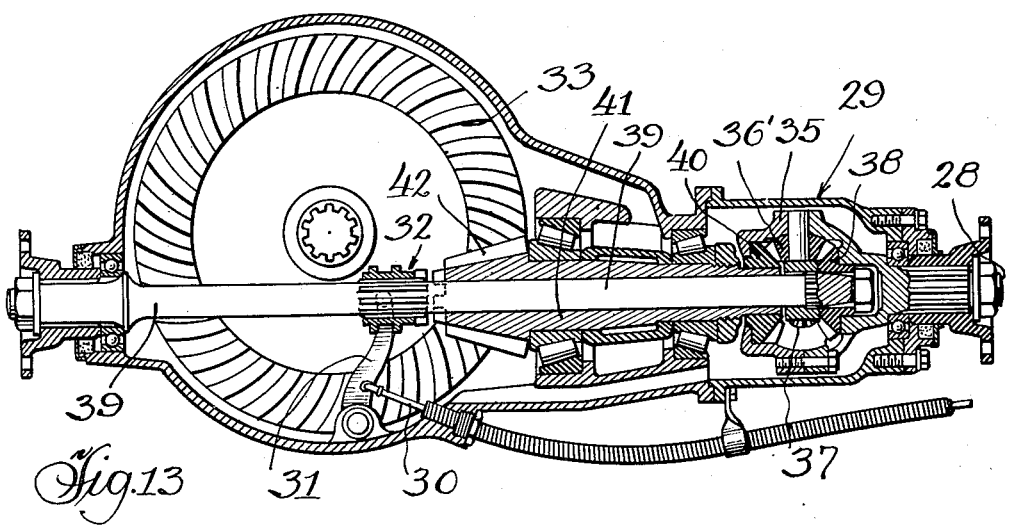
Fig. 13 is a view in vertical cross section through the central portion of the same differential.

Power from the engine is transmitted to the driving mechanism through a shaft 28 and a differential 29, as shown in Fig. 13. When it is desired to secure even power to the front and rear drive axles, the differential 29 may be disengaged by operating a rod 30 which controls a lever 31 and clutch 32 as shown in Fig. 13.

Figure 12:
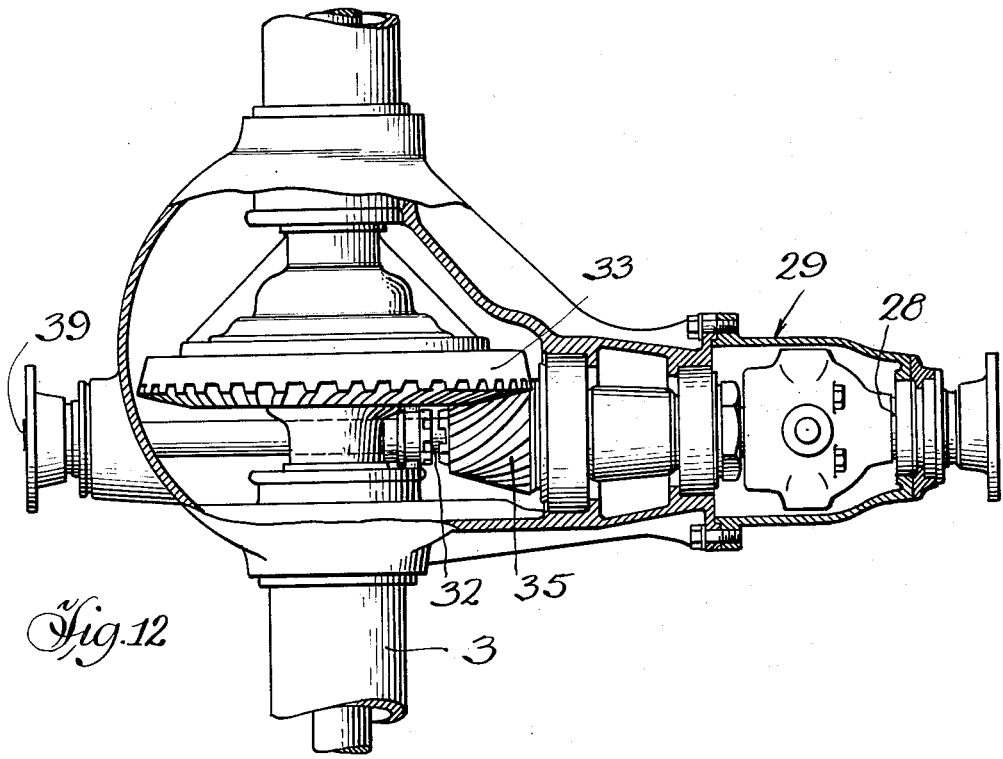
Fig. 12 is a top plan view with a portion of the housing broken away to show a novel type of differential adapted for use with my device.

When the clutch 32 is disengaged, the differential 29 is free to distribute the power between gear 33 and the continuing shaft 39, which latter shaft carries the power to the rear axle 2. As shown in Figs. 12 and 13, I have provided a direct drive in connection with a gear of the hypoid type. The power supply from the engine is transmitted through shaft 28. An outer yoke 35 is fixedly attached to and revolves around the axis of shaft 28. Rotatably mounted within the yoke 35 are gears 36' and 37 which likewise revolve around the axis of shaft 28 with yoke 35. A bevel gear 38 is attached to supplementary shaft 39 which, as shown in Fig. 13, is centrally disposed through sleeve shaft 41 and rotates with it. This novel arrangement obviates the necessity of spur gears and the like. Within the yoke 35 and opposite gear 38 is a bevelled gear 40 which is positively attached to the sleeve shaft 41 which is provided with a ring gear pinion 42 for cooperation with ring gear 33. Gears 36' and 37 mesh at all times with gears 38 and 40. Thus when slippage of one or both wheels of either set of the drive wheels occurs, the power is equalized by the rotation of gears 36 and 37 creating a greater thrust on either gear 38 or 40. In a conventional bevel pinion and gear, the axis of the pinion intersects the axis of the gear. In order to avoid this and thus save space and further to get a direct drive and thus avoid loss of energy by reason of the intersecting axes or spur gears, I have devised a direct drive as shown in which the axis of the pinion passes to one side of the axis of the gear. The ordinary form of gear differential for the rear drive wheels is enclosed in the enlarged portion 43 of axle housing 2, and similar provision is made for a differential for the forward drive wheels in the enlarged portion of the axle housing 3.

The springs 16, instead of being mounted parallel to each other and at right angles to the drive axles, are so mounted that the springs are closer to each other at the front drive axle than at the rear drive axle, as is shown in Figs. 1 and 11, and provides a more definite center of load for the truck, as well as permitting a greater radius for the turning of the front drive wheels around the axis of the main turntable 5, thus permitting greater clearance of the wheels as the front drive axle 26 turns upon the secondary turntable over the front drive axle.

Having thus described the invention, I claim:

1. In a power driven vehicle, a chassis, a drive and mounting assembly therefor pivotally mounted on said chassis and comprising a turntable for rotative movement relative to the chassis, said turntable having arms extending crosswise of the chassis, a pair of springs rockingly mounted on said arms intermediate their ends, front and rear axles mounted adjacent the opposite ends of said springs, and a supplemental turntable member attached to the front end of said springs and rotatably attached to the front axle.

2. In a vehicle, a chassis, drive and mounting assembly therefor pivotally mounted on said chassis and comprising a turntable for rotation with respect to the chassis, said turntable having arms extending transverse of the assembly, a a pair of springs rockingly mounted on said arms adjacent their central portion, an axle placed at each end of said springs, a supplemental turntable member attached to the front end of said springs and rotatably mounted on the front axle, and means at the ends of said supplemental turntable for a slot limiting the rotative movement of the front axle.

3. In a vehicle, a chassis, drive and mounting assembly therefor pivotally mounted on said chassis and comprising a turntable for rotation with respect to the chassis, said turntable having arms extending transverse of the assembly, a pair of springs rockingly mounted on said arms adjacent their central portion, an axle placed at each end of said springs, a wishbone tongue connected with the forward of said axles and at the front end to the chassis, a supplemental turntable member attached to the front end of said springs and rotatably mounted on the front axle and means at the ends of said supplemental turntable for a slot limiting the rotative movement of the front axle.

WALTER ARTHUR STEWART.